June 30, 1953 N. E. AUTEN 2,643,659
DEVICE FOR WASHING ARTICLES SUCH AS DRINKING GLASSES
Filed Sept. 22, 1949 5 Sheets-Sheet 1

Inventor:
Noel E. Auten
by his Attorneys
Howson &
Howson

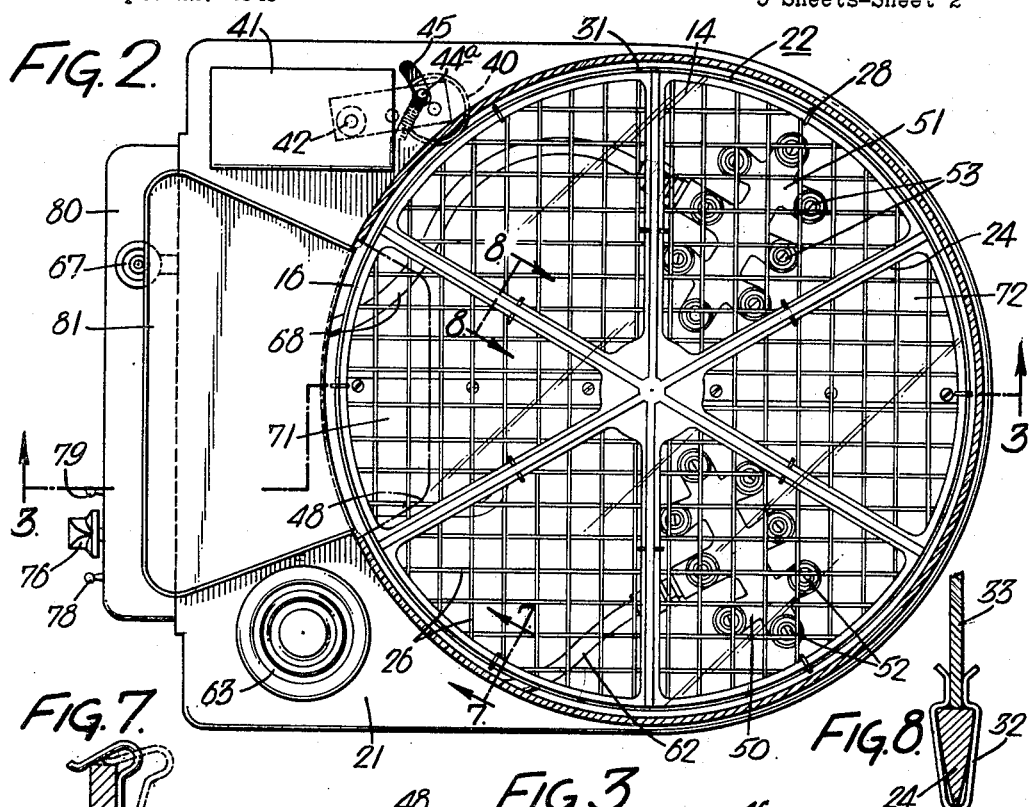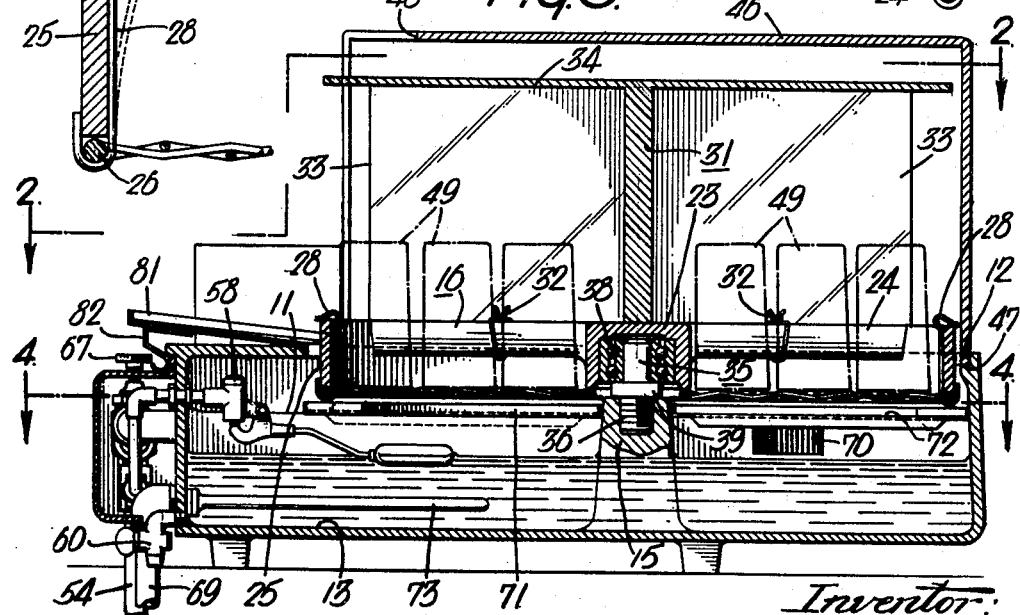

June 30, 1953  N. E. AUTEN  2,643,659
DEVICE FOR WASHING ARTICLES SUCH AS DRINKING GLASSES
Filed Sept. 22, 1949  5 Sheets-Sheet 3
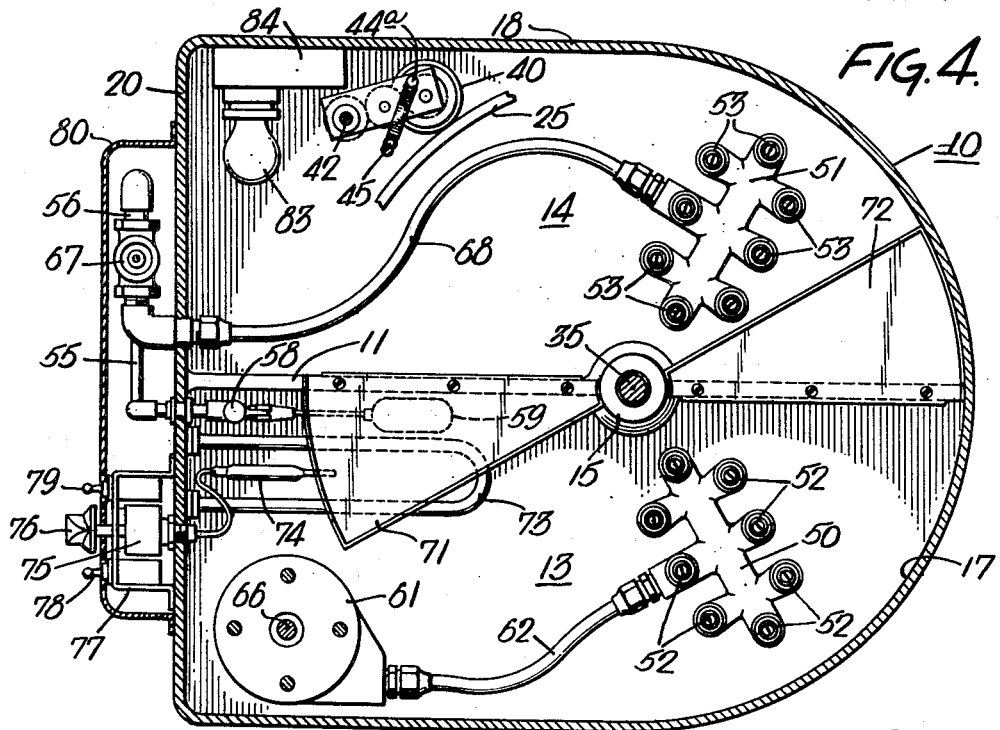
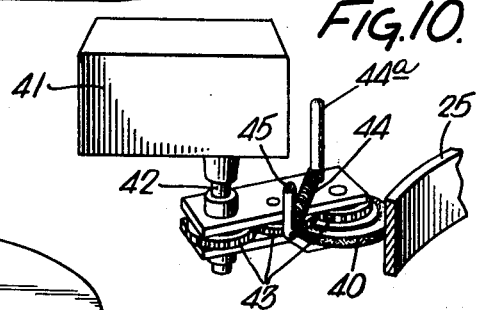
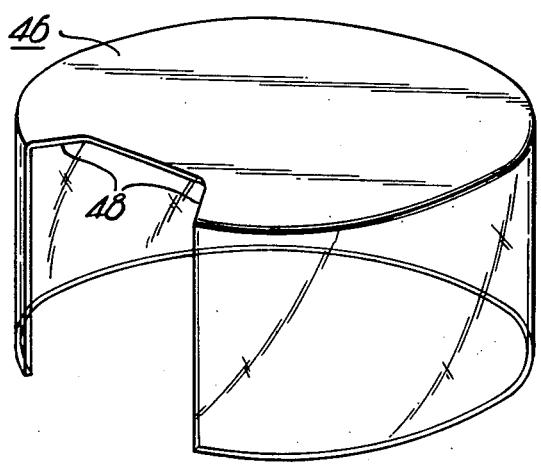
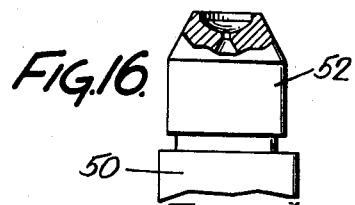

June 30, 1953  N. E. AUTEN  2,643,659
DEVICE FOR WASHING ARTICLES SUCH AS DRINKING GLASSES
Filed Sept. 22, 1949  5 Sheets-Sheet 4

Inventor:
Noel E. Auten
by his Attorneys
Howson & Howson

June 30, 1953 N. E. AUTEN 2,643,659
DEVICE FOR WASHING ARTICLES SUCH AS DRINKING GLASSES
Filed Sept. 22, 1949 5 Sheets-Sheet 5
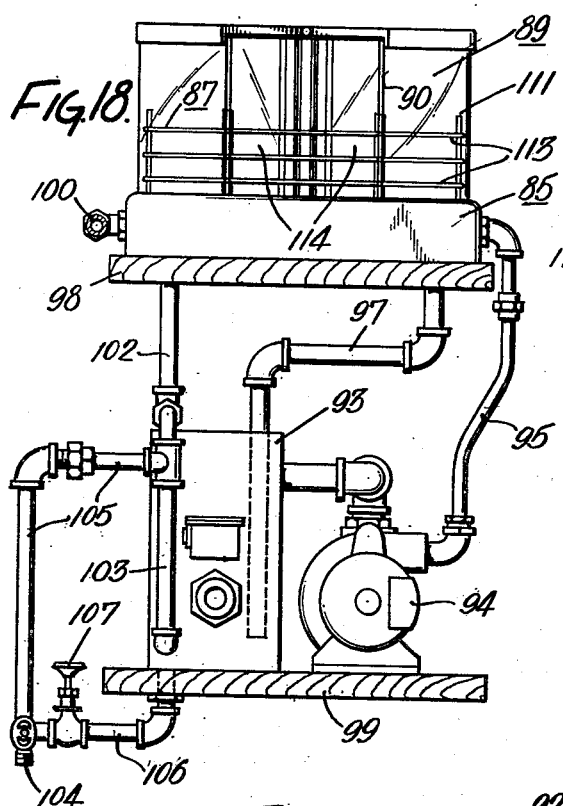
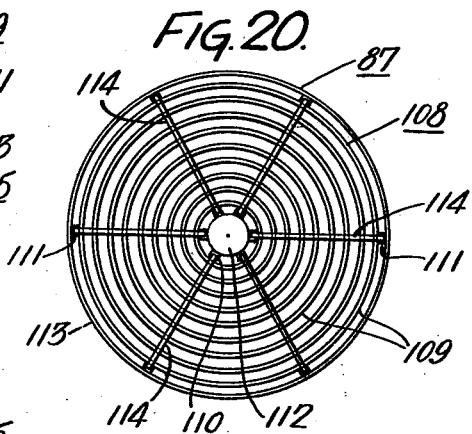
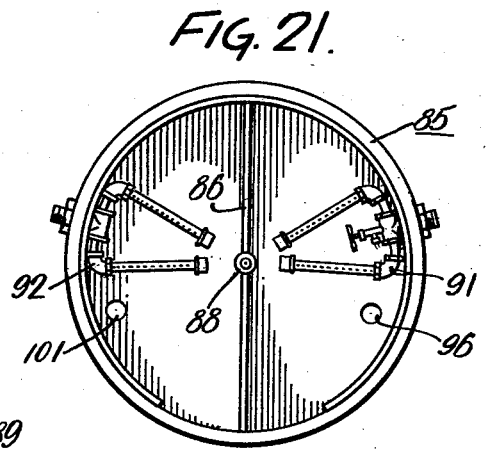
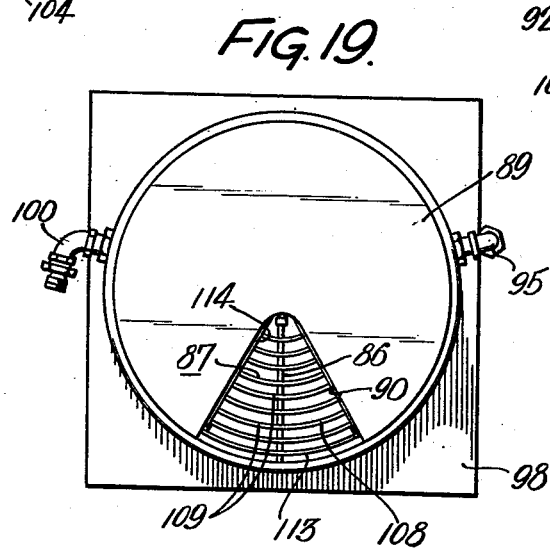
Inventor:
Noel E. Auten
by his Attorneys
Howson &
Howson Patented June 30, 1953

2,643,659

UNITED STATES PATENT OFFICE 2,643,659

DEVICE FOR WASHING ARTICLES SUCH AS DRINKING GLASSES

Noel E. Auten, Wyndmoor, Pa., assignor to Metal Specialties, Inc., Philadelphia, Pa., a corporation of Pennsylvania Application September 22, 1949, Serial No. 117,234

5 Claims. (Cl. 134—80)

This invention relates to devices for washing and rinsing articles such as drinking glasses. More particularly, the invention relates to a novel device of this character which is particularly adapted for use in establishments such as bars, drugstores, etc. which serve the public. This application is a continuation-in-part of my prior application, Serial No. 779,014, filed October 10, 1947, which has now become abandoned.

Heretofore, it has been the general practice in such establishments to wash articles, such as drinking glasses, manually. This practice is very unsatisfactory from the standpoint of public health, and it is highly objectionable to many customers. Manual washing of such articles precludes the use of water of very high temperature, and it is therefore ineffective to attain complete cleansing and sterilization of said articles. Moreover, when such articles are manually washed, they do not dry quickly without wiping, due to the fact that the temperature of the water cannot be sufficiently high to promote rapid drying. This frequently results in use of wet drinking glasses and the like which is objectionable. Further still, an attendant may be careless and prone to devote very little time or effort to the washing of such articles, especially during rush periods.

While various devices have been devised in the past for the washing of dishes and such articles, none of them has been entirely satisfactory for use in establishments such as above mentioned, particularly where large numbers of drinking glasses are handled. Any prior devices which might have been thus used have been inefficient and/or too complicated in structure and operation and/or too costly to manufacture.

The principal object of the present invention is to fulfill the need for a device of the above-mentioned character which shall be entirely satisfactory for use in establishments such as above mentioned.

Another object of the invention is to provide a device which is simple in construction, highly efficient in operation, easy to operate, and capable of low cost manufacture and sale.

A further object of the invention is to provide a device which enables rapid and thorough washing and rinsing of drinking glasses and like articles.

A further object of the invention is to provide a compact portable device which can be easily installed on a bar, soda fountain or the like, and the operation of which can be observed by customers.

Other objects and features of the invention will be apparent from the following detailed description.

In the accompanying drawings:

Fig. 2 is a sectional plan view taken along line 2—2 of Fig. 3;

Fig. 3 is a sectional view taken along line 3—3 of Fig. 2;

Fig. 4 is a sectional view taken along line 4—4 of Fig. 3;

Fig. 7 is a detail sectional view taken along line 7—7 of Fig. 2;

Fig. 8 is a detail sectional view taken along line 8—8 of Fig. 2;

Fig. 9 is a perspective view of the cover;

Fig. 10 is a perspective view of the driving mechanism for the rotatable carrier;

Fig. 16 is a fragmentary sectional view of one of the spray nozzles;

Fig. 17 is a plan view of the same;

Fig. 18 is a front elevational view of a different embodiment as shown in the earlier application above mentioned;

Fig. 19 is a plan view of the same;

Fig. 20 is a plan view of the rotatable carrier employed in that device; and

Fig. 21 is a plan view of the base unit with the carrier and cover removed.

Figure 1:
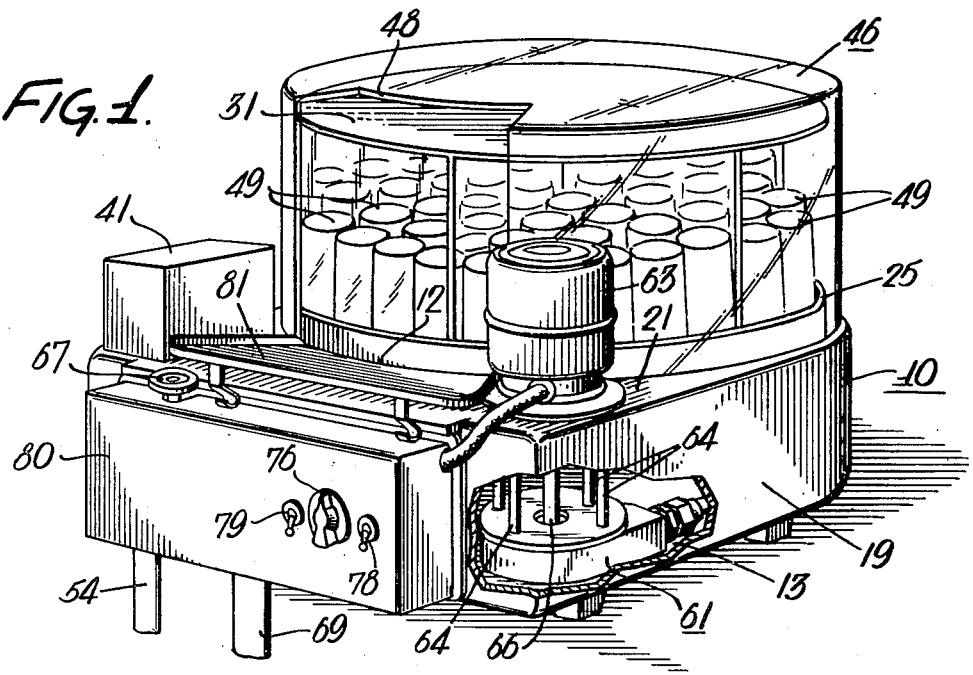
Fig. 1 is a perspective view of a preferred form of the device according to the present invention, a portion of the base being broken away for the purpose of illustration.

Referring first to the preferred embodiment as shown in Figs. 1 to 15, there is provided a base or tank unit 10 which is preferably formed of metal and which is constructed to serve as a base tank for wash and rinse waters. As may be seen in Figs. 4 and 15, in the preferred embodiment the said base unit is provided with a partition 11 which extends diametrically of a circular top opening 12, and which divides the said unit into two tanks or compartments 13 and 14 for the wash water and the rinse water respectively. Centrally of the opening 12 is a bearing standard 15 which projects upward from the bottom of base unit 10 and which serves to support a rotatable circular carrier (Figs. 2 and 3) designated generally by reference character 16. This carrier serves to carry the articles, such as drinking glasses, to be washed and rinsed by upwardly-directed sprays, as hereinafter described.

Figure 15:
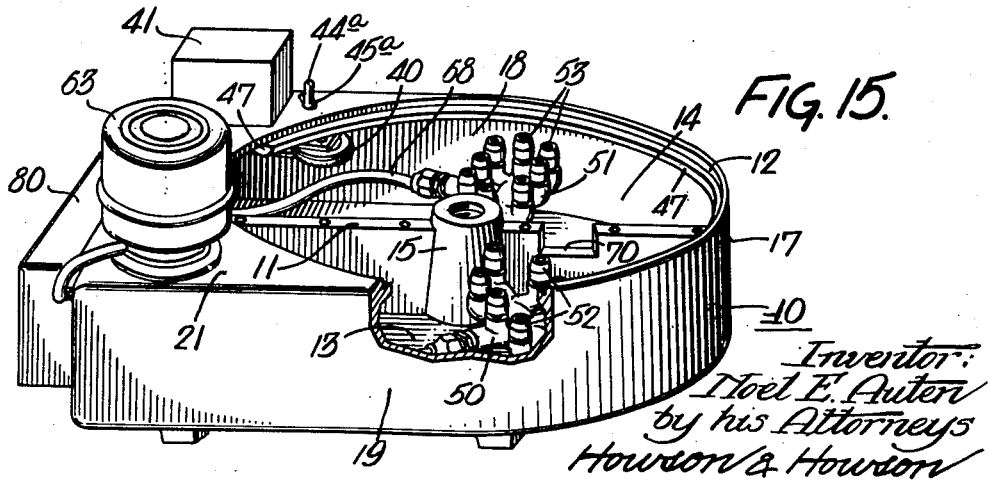

The tank unit 10 may be formed as a casting and it may be shaped as shown in Figs. 4 and 15, having a semi-circular rear wall 17, straight side walls 18 and 19, a straight front wall 20, and a shelf-like top portion 21 which extends rearwardly from the front wall 20 and partially defines the top opening 12. By forming the unit 10 as a casting, the partition 11 and the standard 15 may be formed integrally with the walls and bottom of the unit.

The carrier 16 is supported by the standard 15 within the opening 12 and it is substantially coextensive with said opening. The carrier is preferably composed of removable parts, as may be seen in Figs. 11 to 13. One part of the carrier is a wheel-like support 22 having a hub 23, spokes 24, and a rim 25. A second part of the carrier is a water-pervious bottom member 26 having a central aperture 27, which member is removably fastened to the rim of the wheel-like support 22 by means of spring clips 28, as shown in Fig. 7. The bottom member 26 may be composed of a circular rim 29 and an open mesh body 30, so that the clips 28 may engage the rim. However, it is to be understood that the bottom member 26 may be of any desired construction which is capable of supporting the articles to be washed and which permits water to pass through with very little resistance or obstruction. Preferably the carrier is divided into sectors, and to this end there is provided a partition assembly 31 which is removably secured to the spokes of the wheel-like support 22 by means of spring clips 32, as shown in Fig. 8. The radial partitions 33 correspond in number and angular spacing to the spokes 24, and the partitions rest on the spokes when the parts are assembled. As may be seen in Fig. 8, the spokes 24 are preferably formed so as to have upwardly divergent sides, thus facilitating application of the clips 32 and also presenting minimum resistance or obstruction to upward passage of water. With this construction, any upwardly-directed water which strikes the spokes is simply deflected slightly and is not stopped.

In the embodiment illustrated, there are six of the radial partitions 33 which are equally spaced angularly and which divide the rotatable circular carrier 16 into six substantially similar sectors which are adapted to receive article, such as drinking glasses, to be washed. Preferably, the partition assembly 31 also includes a circular top or cover member 34 which closes the top of each sector.

Regarding the composition of the several parts of the carrier, the wheel-like support 22 and the water-pervious bottom member 26 are preferably formed of metal, while the partition assembly 31 is preferably formed of a transparent material, such as Plexiglas. The wheel-like support 22 may be formed as a metal casting. The bottom member 26 may be fabricated in any suitable manner. The partition assembly 31, excepting the cover 34, may be molded and then the cover may be secured thereto, as by means of a suitable adhesive or cement.

As shown in Fig. 3, the assembled carrier is rotatably supported on the bearing standard 15 by means of a spindle 35, the lower portion 36 of which is threaded for insertion in a threaded opening or recess 37 of the standard 15. The spindle 35 supports a bearing 38 which is adapted to seat on a flange 39 provided on the spindle 35. The hub 23 of the carrier is recessed to fit down over the bearing 38.

The rotatable carrier 16 may be driven in any suitable manner. For example, the carrier may be driven by a friction drive mechanism as shown in Figs. 4 and 10. This mechanism comprises a friction wheel 40 which engages the rim 25 of the rotatable carrier, and which is driven by a driving unit 41 containing an electric motor and preferably also a speed reducing gear train. As may be seen in Figs. 1, 2 and 15, the enclosed driving motor is mounted at one side of the shelf-like portion 21 of the base unit. The driving shaft 42 extends downward below the shelf-like portion 21 to a gear assembly 43 which is swivelly supported by shaft 42 and carries the friction wheel 40. The wheel 40 is driven by the shaft through the gear train and is held in engagement with the rim 25 by a spring 44 which is connected to a bolt or pin 45 carried by the shelf-like portion 21. A pin 44a, which may serve to hold one end of the spring, extends upward from the gear assembly 43 through a slot 45a (Fig. 2). By this arrangement, the driving of the carrier may be interrupted by moving the pin 44a against the action of spring 44, without stopping the driving motor.

A stationary cover 46 (Figs. 1 and 9) serves to enclose the carrier 16 and is removably supported by the tank unit 10. As may be seen in Fig. 15, the tank unit 10 has an inwardly-extending lip or ledge 47 to support the cover. The cover has an opening 48 for insertion of articles, such as drinking glasses 49, into the sectors of the carrier. Preferably, the opening 48 is of an angular dimension almost equal to the angular dimension of one of the sectors of the carrier, as may be seen in Fig. 1. The cover 46 is preferably formed of a transparent material, such as Plexiglas.

The carrier 16 is rotated counterclockwise, as viewed in Fig. 2, so that the articles to be washed and rinsed first pass above the wash water compartment 13 and then pass above the rinse water compartment 14. The washing and rinsing operations are performed by means of stationary spray heads 50 and 51 (Fig. 4) disposed respectively in the compartments 13 and 14 and having spray nozzles 52 and 53. Each spray head comprises a hollow casing from which the nozzles project. The spray heads may simply rest on the bottom of the tank unit. It will be seen that the spray heads are similar and are similarly arranged in said compartments, the nozzles on each spray head being disposed in a prearranged cluster and being directed upwardly for projection of water through the foraminous bottom 26 of the carrier 16. As described in greater detail hereinafter, the fash water is used repeatedly and is recirculated through the spray head 50, but the rinse water is used only once and is continually drained off.

The disposition of the spray heads, the number and arrangement of the nozzles on each spray head, and the water-spray characteristic of the nozzles, are all important factors from the standpoint of optimum operation. Regarding the disposition of the spray heads, it is important that they be located far enough from the opening 48 to preclude the possibility of the sprayed water from reaching said opening. Of course, the partitions and top of the carrier also help in this respect. It is also important that the spray heads be so located as to minimize the possibility of either the wash water or the rinse water escaping to the wrong compartment. It has been found that the spray heads are best disposed with the longitudinal axis of each at a 30° angle to an imaginary transverse plane passing through the center of standard 15 perpendicular to the base partition 11. This disposition of the spray heads may be clearly seen in Fig. 4.

As may also be seen in Fig. 4, there are preferably eight nozzles on each spray head arranged as shown. Water is supplied under pressure to the central part of each spray head so that the nozzles are subjected to substantially the same pressure. The illustrated arrangement of the nozzles, together with the spray characteristic of each nozzle as described below, provides maximum coverage and optimum cleansing and rinsing of the glasses in each sector of the carrier.

As may be seen in Figs. 16 and 17, each nozzle has an oblong mouth to give a fan-shaped spray. The oblong mouths of the nozzles are directed radially toward the center of the hub 15. The nozzles may be rotatably adjustable so that they may be so disposed. Thus the fan-shaped sprays produced by the nozzles have their planes radially aligned with the center of rotation of the carrier. This insures that each drinking glass or like article on the rotating carrier will be subjected to spraying for a sufficiently long time to thoroughly wash and rinse the glass. Thus it provides very effective bacteria-killing action during the washing of each glass and also thorough rinsing of the glass.

Figure 5:
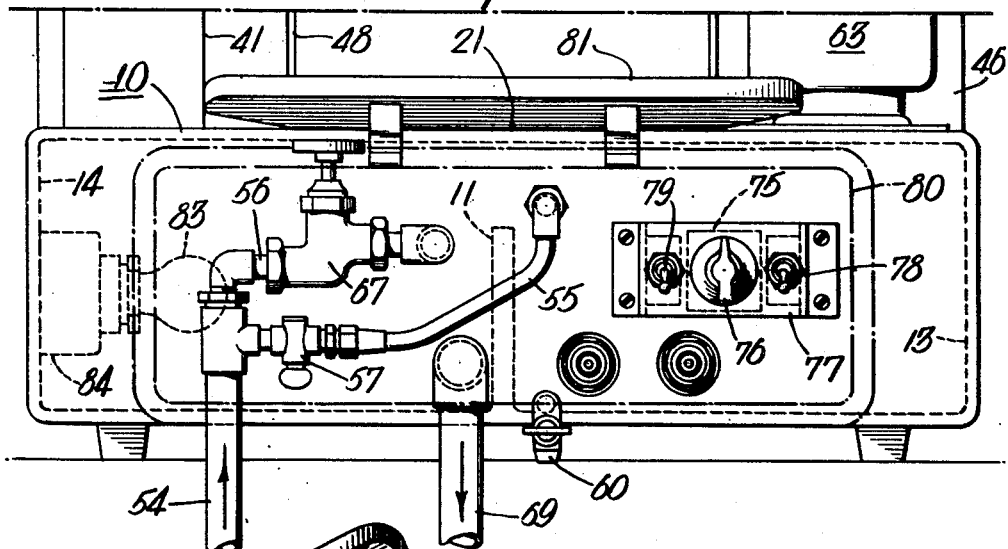
Fig. 5 is a front elevational view showing the control elements.
Figure 6:
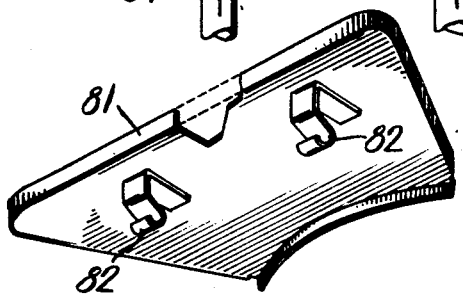
Fig. 6 is a perspective view of a front drip pan which is preferably employed.
Figure 11:
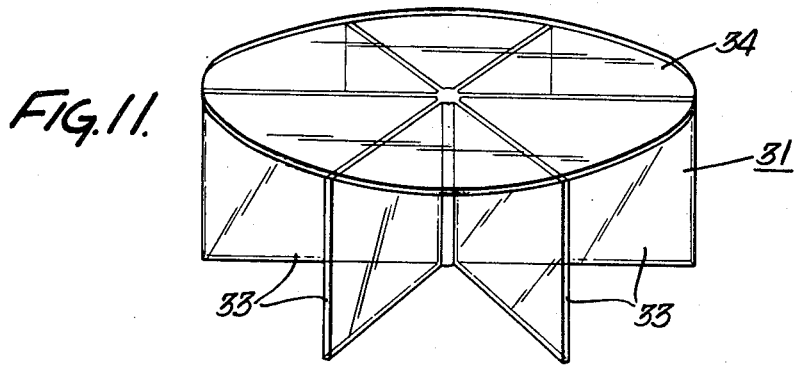
Figs. 11 to 15 are perspective views showing the parts of the carrier, the splash guards, and the base or tank unit, the views collectively constituting an "exploded" perspective illustration of the various parts or members.
Figure 12:
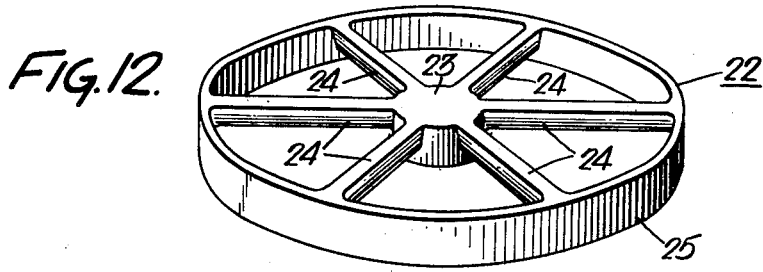
Figure 13:
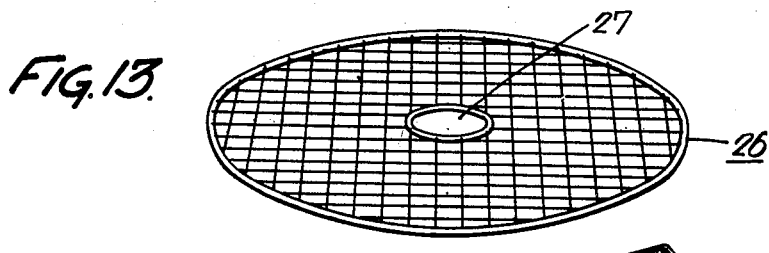

As may be seen in Fig. 5, water is supplied to both of the tank compartments 13 and 14 from a single supply conduit such as shown at 54, through branches 55 and 56, respectively. A stop cock 57 is provided in branch 55 but is normally open. This branch conduit extends through the front wall 20 of the tank unit 10 to a valve 58 (Figs. 3 and 4) which is controlled by a float 59 to maintain the desired water level in the wash water compartment 13. A drain cock 60 is provided for the compartment 13 but is normally maintained closed.

The water in compartment 13 is circulated and supplied to the spray head 50 under pressure by means of a motor-driven pump 61 (Fig. 4) to which the spray head is connected by a conduit 62. The pump 61 is disposed at the front portion of the base or tank unit 10. As may be seen in Figs. 1 and 15, the pump motor 63 is mounted on the shelf-like portion 21 of base unit 10, and the pump 61 is supported by studs 64 extending downward from the mounting plate 65. The pump shaft is shown at 66.

Referring to Figs. 4 and 5, the branch conduit 56 for the supply of rinse water includes a valve 67 and extends through the front wall 20 to a conduit 68 which is connected to the rinse spray head 51. During operation, the rinse water is supplied continuously to the spray head 51 at a rate which is dependent upon the setting of valve 67. A drain pipe such as shown at 69 continuously drains the rinse water from the compartment 14.

As shown in Figs. 3 and 15, a cut-out 70 is provided in the partition 11 above the normal water level of compartment 13, the purpose of this being to prevent overflow in the event that the float valve 58 should fail to function. Should the water in compartment 13 rise to the cut-out 70, it would flow into the compartment 14 and would be carried off by the drain 69.

Figure 14:
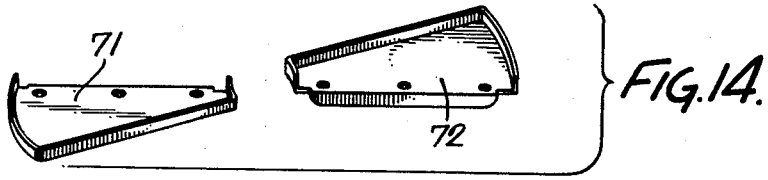

As may be seen in Figs. 4 and 14, there are preferably provided splash guards 71 and 72. These guards are removably secured to the partition 11 by means of screws. They are provided with turned edges and are arranged as shown in Fig. 4, so that the front guard 71 extends partially over the compartment 13, while the rear guard 72 extends partially over the compartment 14. The front guard 71 prevents residual contents of drinking glasses from entering the wash water compartment 13 and contaminating the wash water. Such contents are carried by guard 71 to the rinse water compartment and are drained off. Both of the guards 71 and 72 aid in the prevention of water splash between the compartments.

The wash water is maintained at a desired elevated temperature, e. g. 180° F., by means of an electrical heater 73 (Fig. 4) of the immersion type, which is controlled by a thermostat 74 through an adjustable switch 75 mounted on wall 20 and controlled by a knob 76. A mounting bracket 77 serves to support the switch 75 and also supports control switches 78 and 79 for the pump motor 63 and the carrier driving motor respectively. A front cover 80 serves to enclose the switches and also the conduits at the front of the device. As may be seen in Figs. 1, 3, and 6, a drip pan 81 is preferably provided at the front of the device and has spring feet 82 which rest on the cover 80.

If desired, a sterilizing lamp 83 (Figs. 4 and 5) may be provided and may be mounted at the front of compartment 14, so as to subject the drinking glasses or other articles to the sterilizing action of the lamp after the washing and rinsing operations. The lamp-supporting casing 84 may be mounted on the side wall of compartment 14 as shown.

The electrical connections of the device are quite simple and are not believed to require illustration. The switch-controlled motors and the thermostatic switch-controlled water heater are simply connected in parallel relation to common supply conductors, the controlling switches being included respectively in the parallel branch circuits. If the sterilizing lamp is employed, it may be connected in parallel with the carrier-driving motor so as to be controlled by the switch 79 which controls said motor.

The installation of the device is very simple. All that is required is connection of the water supply and drain conduits which may be flexible so that they can be run to an available water source and drain. Then the device is plugged into an electric outlet like any ordinary electric appliance. Preferably the water supplied to the device should be at a temperature of 130° to 140°. The supply of water at the desired temperature is most easily accomplished by means of a mixing valve at a dual source of cold and hot water, as will be well understood.

Before use of the device, the valve 67 and the cocks 57 and 60 will all be in closed position. Preparatory to using the device, the cock 57 is opened so as to fill the wash water compartment to the desired level under control of float valve 58. Then a suitable detergent is added and the water is raised to the desired temperature and is maintained thereat by the heater 73, the knob 76 being adjusted to give such temperature.

In operation of the device, the switch 79 is closed to start the carrier-driving motor. This switch may be left closed so that the carrier rotates continuously at low speed except when it is stopped by moving the pin 44a to disengage the friction wheel from the carrier. Of course, the switch 79 may be used to stop the carrier, instead of doing so by means of the pin 44a.

Assuming that drinking glasses are to be washed and rinsed, the glasses are placed in inverted position on the bottom 26 of the carrier, within the various sectors of the carrier, as shown in Figs. 1 and 3. The switch 78 is closed to start the motor of pump 61, and the valve 67 is set to give the desired flow of rinse water. As the carrier rotates, the glasses are first subjected to washing action by the spray nozzles 52 and are then subjected to rinsing action by the spray nozzles 53. The spray action of the nozzles has already been described. The complete washing and rinsing operation is performed during a single revolution of the carrier, and by the time the glasses return to the opening 48, they are practically dry.

A convenient way of using the device is to place dirty glasses on the carrier as they accumulate until the carrier is full, and then start the wash water pump and the rinse spray. The operator can then allow the device to operate until he is free to remove the glasses, at which time he may stop the wash water pump and the rinse spray until the carrier is again filled with dirty glasses.

The operation of the device is clearly visible since the cover 46 and the carrier partitions are transparent. Thus the customers in an establishment where drinks are dispensed can observe the cleansing and rinsing of glasses.

When the device is not in operation, it can be used for storage of glasses or like articles, in the manner of a cabinet. Thus the space occupied by the device is not wasted even when the device is not in operation.

It will be seen from the foregoing description that the device is so constructed that it can be easily cleaned. The cover 46 may be removed, after which the carrier assembly may be removed. This enables cleaning of the wash water and rinse water compartments, and it also enables thorough cleaning of the carrier assembly. After cleaning, it is only necessary to replace the carrier assembly and the cover. Normally the wash water should be changed about once a day, and it is desirable that the device be cleaned each time the wash water is changed.

The preferred construction of the device as illustrated provides a compact device with the parts arranged to best advantage. The particular shape of the tank unit 10, as clearly shown in Fig. 15, provides at the front part of the device the shelf 21 upon which the driving unit 41 and the pump motor 63 are mounted. Moreover, the particular construction provides space at the front to accommodate the float valve 58 (Fig. 3) and other parts, and also provides the straight front wall 20 which serves as a mounting panel for the switches and conduit couplings and also accommodates the front cover 80.

It will be apparent from the foregoing description that the invention provides a device of simple construction which may be manufactured and sold at low cost, which is easy to operate and is highly efficient in operation, and which can be easily cleaned. Furthermore, the device is a compact portable unit, and it can be easily installed.

As mentioned at the outset of the present specification, this application is a continuation-in-part of co-pending application Serial No. 779,014, filed October 10, 1947. While the embodiment shown in that application is not the preferred form of the device, the general disclosure of that embodiment is included in Figs. 18 to 21 of the drawings of the present application to which reference is now made. As in the first-described embodiment, the device shown in Figs. 18 to 21 comprises a base tank unit 85 having a dividing partition 86 to provide a wash water compartment and a rinse water compartment, a rotatable carrier 87, mounted on a central standard 88, and a transparent enclosure 89 having an opening 90 through which glasses or other articles to be cleansed may be inserted on the rotatable carrier. The device further comprises spray heads 91 and 92 disposed respectively in the above-mentioned compartments. In this instance, however, the wash water is not confined to the wash water compartment of the base unit 85 but is supplied to the spray head 91 in said compartment from a separate wash water storage tank 93. A motor-driven pump unit 94 supplies the wash water under pressure through conduit 95. A drain opening 96 is provided in the wash water compartment, so that the wash water drains continuously back to the storage tank 93 through conduit 97. In the illustration of Fig. 18 the washing device is shown resting on a support 98, while the storage tank 93 and the pump unit 94 are shown mounted on a lower support 99. Of course, it will be understood that any suitable arrangement may be utilized.

The rinse water is supplied from a hot water line (not shown) and it enters the rinse water compartment through the inlet 100. The rinse water drains through the drain opening 101 and it passes through a drain pipe 102 which connects with the bottom of the storage tank 93 through pipe 103. The drain pipe 102 is also connected to the main drain 104 through the overflow pipe 105. The storage tank 93 is also connected to the main drain 104 through the pipe or conduit 106 which is controlled by valve 107. The storage tank is originally flushed from the hot water line with the valve 107 open, and the tank is then filled with the valve closed. The hot water flows through pipes 102 and 103 into the storage tank 93 until the level of the water within the tank is up to the level of the overflow 105. During operation of the device, the rinse water from the rinse water compartment bypasses the tank 93 and passes directly through the overflow 105 down the main drain. The valve 107 is used to drain the storage tank whenever it is desired to change the wash water.

As may be seen in Fig. 21, the spray heads in this embodiment are generally U-shaped with the arms thereof directed inwardly toward the center rotation of the carrier. These arms are provided with a plurality of apertures through which the water is emitted.

As shown in Figs. 18 and 20 the carrier employed in this device comprises a bottom 108 which is made up of a plurality of concentric rings 109 and a plurality of radial elements (not visible) which connect the bottom rings and which are vertically extended into the bottom ends of inner and outer channel members 110 and 111. The inner channel members 110 are fastened to a central hub 112, while the outer channel members 111 are bound together by vertically spaced rings 113. The channel members serve to support partitions 114 which divide the carrier into substantially similar sectors, as in the first embodiment.

As illustrated and described in the above-mentioned co-pending application the carrier may be driven by means of a turbine arrangement utilizing some of the wash water as the driving means. This involves the provision of a propulsion jet on the wash water spray head, and the provision of blades on the rotatable carrier in cooperative relation with the propulsion jet. A manually controllable brake may be employed to control the speed of the carrier.

While certain embodiments of the invention have been illustrated and described, the invention is not limited thereto but is capable of various modifications and other embodiments.

I claim:

1. A device for washing and rinsing articles such as drinking glasses, comprising a stationary base tank having a circular top opening and having a partition extending diametrically of said opening and dividing the tank into two compartments one for wash water and the other for rinse water, a rotatable circular carrier at the top of said tank and substantially coextensive with said circular opening, said carrier having a water-pervious bottom to support said articles and also including a wheel-like support having radial spokes and a plurality of radial partitions supported by said spokes and dividing the carrier into a plurality of substantially similar sectors, means rotatably supporting said carrier at its center, means for driving said carrier, a stationary cover having an opening for insertion of said articles into each of said sectors, stationary spray means in the wash water compartment of said base tank, arranged to project wash water upwardly through the bottom of said carrier, stationary spray means in the rinse water compartment of said base tank, arranged to project rinse water upwardly through the bottom of said carrier, means for circulating wash water through the first-recited spray means, means for conveying rinse water to said last-recited spray means, and means for continuously draining the rinse water from the rinse water compartment.

2. A device according to claim 1, wherein said carrier includes a water-pervious bottom member removably secured to said wheel-like support, and a partition unit removably secured to said support.

3. A device according to claim 2, including spring clips securing said bottom member to the rim of the wheel-like support, and spring clips securing said partition unit to the spokes of the wheel-like support.

4. A device according to claim 3, wherein the spokes of the wheel-like support have upwardly divergent sides to facilitate application of spring clips thereto and to minimize resistance to upward passage of water.

5. A device for washing and rinsing articles such as drinking glasses, comprising a stationary base tank having a circular top opening and having a partition extending diametrically of said opening and dividing the tank into two compartments one for wash water and the other for rinse water, a rotatable circular carrier at the top of said tank and substantially coextensive with said circular opening, said carrier having a water-pervious bottom to support said articles and also including a wheel-like support having radial spokes and a plurality of radial partitions supported by said spokes and dividing the carrier into a plurality of substantially similar sectors, means rotatably supporting said carrier at its center means for driving said carrier, a stationary cover having an opening for insertion of said articles into each of said sectors, stationary spray means in the wash water compartment of said base tank, arranged to project wash water upwardly through the bottom of said carrier, stationary spray means in the rinse water compartment of said base tank, arranged to project water upwardly through the bottom of said carrier, means in the wash water compartment for heating water therein, means for circulating the heated wash water through the first-recited spray means, means for conveying rinse water to said last-recited spray means, and means for continuously draining the rinse water from the rinse water compartment.

NOEL E. AUTEN.

References Cited in the file of this patent

UNITED STATES PATENTS

| Number | Name | Date |
|---|---|---|
| 1,156,424 | Murray | Oct. 12, 1915 |
| 1,553,428 | Benn | Sept. 15, 1925 |
| 1,623,703 | Ruff | Apr. 5, 1927 |
| 1,707,159 | Burnham | Mar. 26, 1929 |
| 2,122,018 | Wolf | June 28, 1938 |
| 2,170,307 | Ohme | Aug. 22, 1939 |
| 2,189,451 | Peters | Feb. 6, 1940 |
| 2,558,818 | Campbell | July 3, 1951 |